United States Patent [19]
Khattak et al.

[11] Patent Number: 5,074,628
[45] Date of Patent: Dec. 24, 1991

[54] LASER BEAM SCANNING DEVICE AND METHOD FOR OPERATION THEREOF

[76] Inventors: Anwar S. Khattak, 612 S. Lincoln St., Spokane, Wash. 99204; Masao Shimoji, E. 3012 Nora Rear Apt., Spokane, Wash. 99207

[21] Appl. No.: 545,726
[22] Filed: Jun. 29, 1990
[51] Int. Cl.$^5$ ............................................. G02B 26/10
[52] U.S. Cl. ................................. 359/205; 359/210; 359/211
[58] Field of Search ............... 350/6.3, 6.4, 3.71, 350/3.72, 286, 6.2, 6.5, 6.9; 250/235, 236

[56] References Cited
U.S. PATENT DOCUMENTS

| | | | |
|---|---|---|---|
| 4,376,582 | 3/1983 | Kirchner et al. | 350/6.4 |
| 4,413,180 | 11/1983 | Libby | 350/6.9 |
| 4,611,881 | 9/1986 | Schmidt et al. | 350/6.9 |
| 4,621,893 | 11/1986 | Lohmann | 350/6.5 |
| 4,699,447 | 10/1987 | Howard | 350/6.9 |
| 4,822,974 | 4/1989 | Leighton | 350/6.4 |

Primary Examiner—Loha Ben
Attorney, Agent, or Firm—Armstrong, Nikaido, Marmelstein, Kubovcik & Murray

[57] ABSTRACT

A laser scanning device and a method for operation thereof includes a laser source, and a laser beam deflector assembly. The laser beam deflector assembly includes a motor driven hollow shaft. The rotating hollow shaft includes an optical element at an end portion thereof. The laser source emits a collimated laser beam which passes through the rotating hollow shaft, and is deflected by the rotating optical element mounted within the hollow shaft. The rotating optical element continuously deflects the laser beam and generates a conical-shaped laser beam, which when intercepted produces an inscribed circle. The inscribed circle is collapsed by a scan lens so as to provide uni-directional or multi-directional scan along a desired scan track.

19 Claims, 4 Drawing Sheets

LASER BEAM SCANNING DEVICE AND METHOD FOR OPERATION THEREOF

BACKGROUND OF THE INVENTION

1. Field of the Invention

This invention generally relates to a laser beam scanning device including method for operation thereof which allows laser scanning in desired directions along a scan track. The laser scanner and the method for operation thereof includes a laser source for emanating a laser beam therefrom, and a laser beam deflector assembly for continuously deflecting the laser beam. This invention further includes a scan lens system for collapsing the laser beam to a line scan in desired directions along a scan track.

2. Description of the Relevant Art

Refined advances in laser technology has led to applications in numerous new industrial and consumer products. The most commonly used laser beam scanners include polygonal mirror scanners, galvanometric scanners, holographic scanners and acoustooptic beam deflectors. The most commonly used beam scanners are employed in various applications, such as, in laser printers, laser bar code readers or the like.

All the above-described devices deflect light or laser beams, and each type of scanner has a preference with respect to a specific application. Modern scanners can be classified into three categories on the basis of application: (a) illuminators, (b) collectors, and (c) an illuminator/collector combination.

In, laser printers, for example, a rotating mirror directs the laser beam to a rotating drum so as to inscribe several hundred dots per inch on a corresponding photosensitive cylindrical surface. In a bar code reader, for example, commonly used in supermarkets, a mirror guides the laser beam so as to scan the bar code label on the product. The reflected light is sensed by a photodiode which transforms an optical signal to an electrical signal for computer use. In a device for measuring dimensions a rotating polygonal mirror, and an optical lens form a parallel light bundle which is used for object measurement by a photodiode sensing of the amount of light which is cut off by the object.

The use of a plane mirror or a rotating polygonal mirror is an essential component in modern scanners for precisely directing the laser beam towards the target scan track.

Illustrated in FIG. 1 is a conventional scanning device having a polygonal mirror 1. The polygonal mirror 1 rotates only in one direction, shown with clockwise rotation by an arrow 3. The conventional device illustrated in FIG. 1 further includes a laser source 5, and a beam expander 8 for expanding the laser beam 10 emanating from the laser source 5. The laser beam 12 exiting from the beam expander 8 is then directed to a face 15 of the rotating polygonal mirror 1. The laser beam 12 exiting from the beam expander 8 is a larger diameter laser beam with the outermost rays along the circumference thereof referenced by the two arrows, labeled 18a and 18b in FIG. 1. The two opposing points 18a, 18b along the circumference of the laser beam 12 is deflected from the face 15 of the polygonal mirror 1 resulting in the laser beam 20 being directed onto a scan lens which focuses the laser beam 20 into a laser scan spot 24 along the scan plane 26.

As further shown FIG. 1, the laser beam 20 can be directed onto the scan lens 22 at different angles from the face 15 of the polygonal mirror 1, thereby entering the scan lens 22 by way of a, for example, laser beam 28 or 30, as shown in dotted lines in FIG. 1.

The conventional device illustrated in FIG. 1 which employs the uni-directional rotating polygonal mirror 1 results in a one way scan; i.e., a scan from point a to point b as shown in FIG. 1. When the laser spot 24 has traversed the scan plane from point a to point b, the laser spot 24 then jumps the scan from point b back to point a, and thus leaving the return trip (i.e., a laser scan along the scan plane 26 from point b to point a) unused.

In an application whereby a return trip scan is desirable or, whereby a scan in the x and y directions on a given scan plane, is required, a single rotating polygonal mirror 1 falls short in fully meeting the desired laser scanning requirements. Therefore, in laser scanning applications requiring scanning other than that a unidirectional straight line sweep, a synchronized system of a set of two mirrors is used.

Galvanometric scanning with two mirrors can also be used for sweeping along the x and y directions. However, the use of two mirrors for galvanometric scanning is relatively slow because the inertia of the mirrors limits the scan rate to about 300–600 hertz (Hz).

A rotating polygonal mirror 1 is the most popular scanning equipment component in numerous modern laser scanning devices. However, the required design specifications for such a device are complex and stringent. The required design specifications can be categorized in three groups; namely, (a) mechanical, (b) optical, and (c) physical. In other words, scanner velocity stability, provision for "roll off", and reduction of scan jitter are some of the design concerns of the conventional laser scanning device which employs the rotating polygonal mirror. For the most part, stability for the device requires a minimum aspect ratio of diameter to thickness of 12 to 1. In high scan rates (where the mirror's peripheral speeds exceed 400 feet per second, tool steel or beryllium are desirable because of the higher strengths of these materials.

The stringent design requirements of mirrors and, in particular, the restricted laser scan which is limited to a one-way sweep are the compelling reasons for an introduction of a scanner that completely eliminates a rotating mirror, and is more versatile in its scanning performance.

In order to design a scanner that will be characterized as having the ability to smoothly inscribe different scan track shapes, a fundamental geometrical shape which can be easily collapsed or transformed to a new and desired scan track contour must be found. The fundamental geometrical shape, suitable for facilitating the desired scan shapes, is a cone, the arbitrary cross-section of which is an inscribed circle. The inscribed circle is collapsed into desired scan contours using a scan lens system. A performance comparison between a single rotating polygonal mirror and the scanner of this invention is illustrated in Examples 2–7 of Table 1.

It is a further object of this invention to provide a laser scanning device and a method for operation thereof which is capable of inscribing different scan track shapes.

It is another more particular object of the present invention to provide a laser scanning device and a method for operation thereof having a laser source for emanating therefrom a laser beam in combination with a laser beam deflector assembly for deflecting the laser beam exiting therefrom. Also, the laser scanning device and the method for operation thereof includes a scan lens system for receiving the deflected laser beam from the deflector assembly, and generally collapses the inscribed circle into the desired configurations along a laser scan track.

SUMMARY OF THE INVENTION

The aforementioned and other objects of the present invention are accomplished by providing a laser scanning device including a method for operation thereof which collapses an inscribed circle into a multi-directional scan shape. The invention includes a laser source which emits a collimated laser beam passing through a deflector assembly, which deflects the laser beam at an exit from the laser beam deflector assembly. A scan lens system receives the rotating laser beam, and collapses the inscribed circle into various configurations along a laser scan track.

The foregoing and other objects, features and advantages of this invention will be apparent from the following, more particular, description of the preferred embodiments of this invention, as illustrated in the accompanying drawings.

DESCRIPTION OF THE PREFERRED EMBODIMENTS

Figure 1:
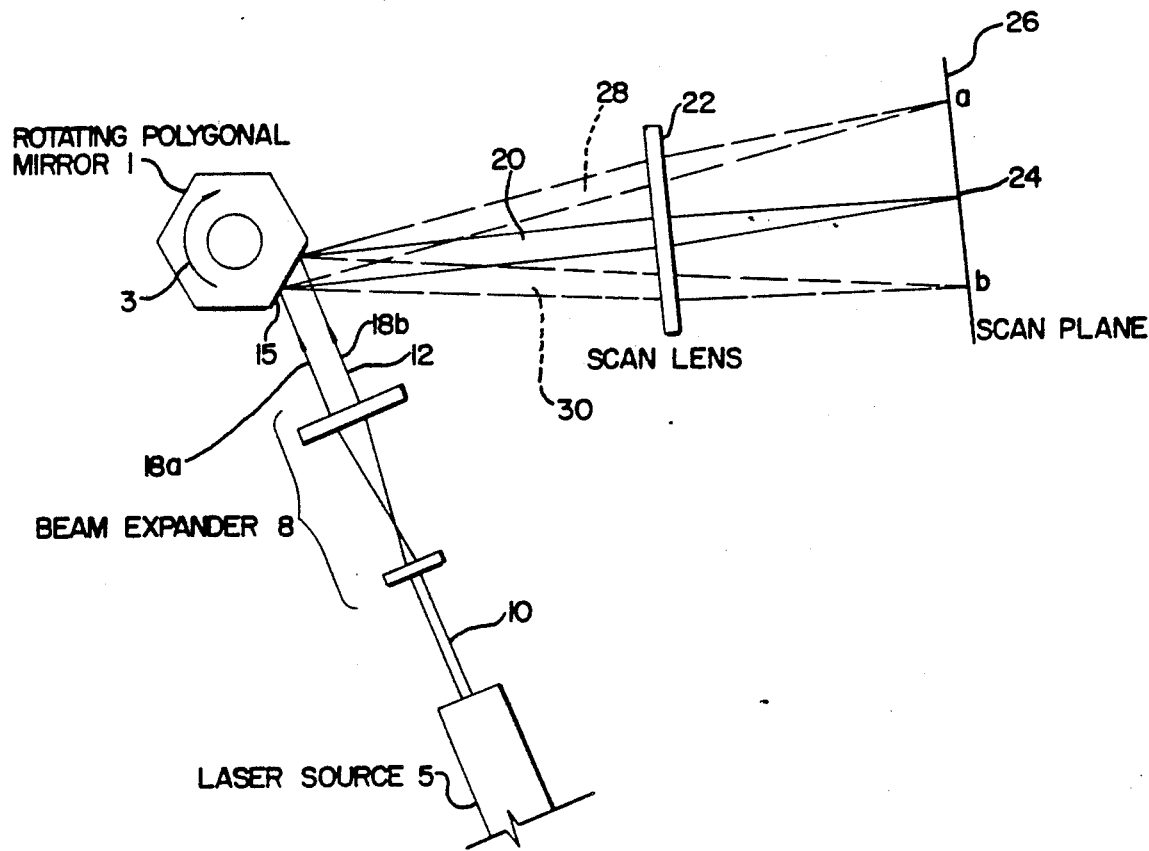
FIG. 1 is a schematic view of a conventional laser scanning device which employs a uni-directional rotating polygonal mirror.
Figure 2:
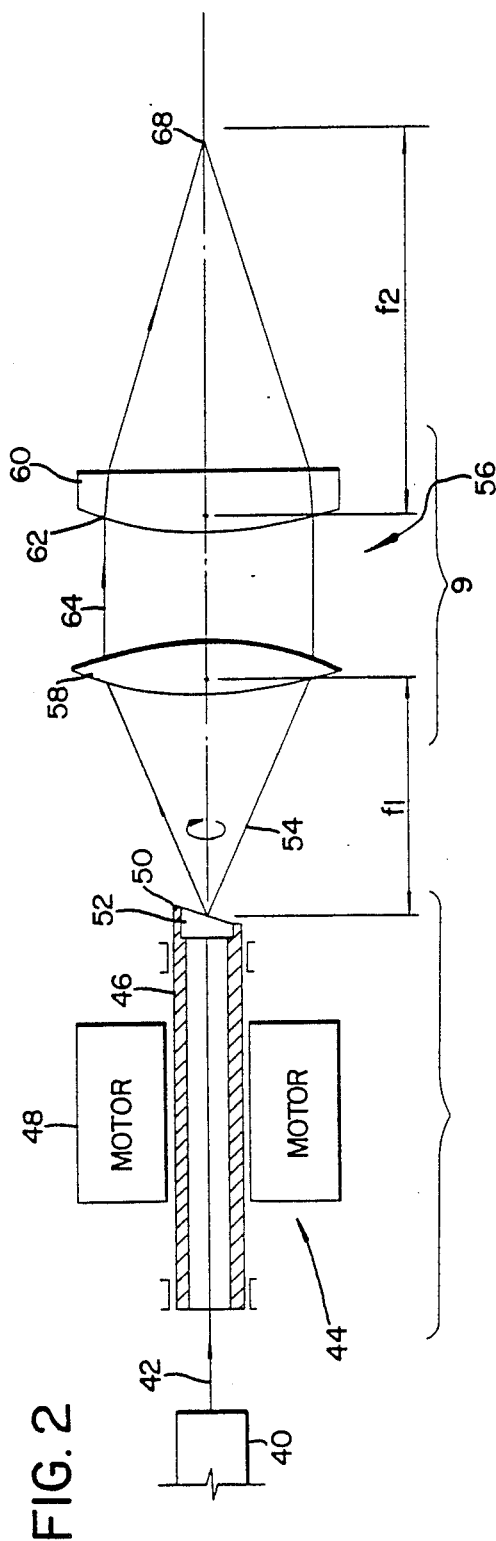
FIG. 2 is a schematic view of a first example of the laser scanning device of the present invention illustrating a laser source, laser beam deflector assembly, and a scan lens system.

FIG. 2 is a schematic view of an example of the laser scanning device of this invention showing a laser source 40 for emitting a collimated laser beam 42, and passing the collimated laser beam 42 through a laser beam deflector assembly, generally designated by reference number 44. The laser source 40 can be a laser diode, a neon helium tube (NeHe or Ne.He), a carbon dioxide laser or the like. The laser beam deflector assembly 44 includes a rotating hollow shaft 46 which is driven by a motor 48. Within the hollow shaft 46, at an end portion 50 thereof, an optical element 52, preferably a prism, is mounted thereon. Although FIG. 2 illustrates only a single optical element or prism 52, a plurality of optical elements may be used or mounted within the hollow shaft 46.

The optical element or prism 52 mounted within the hollow shaft 46 accordingly rotates along with the hollow shaft 46 for continuously deflecting the laser beam exiting from the laser beam deflector assembly 44 or, more particularly, from the rotating optical element 52 so as to generate a cone (laser beam output) 54 in free space. The optical element or prism 52 may have a desired power, measured in prism diopters. A prism diopter is defined as a deflection of 1 cm. at a distance of one meter from the prism. The deflected beam will therefore emerge from the prism at a predetermined angle with respect to the optical axis of the scan lens system 56 described below in more detail. For example, an optical element 52 having a 45° slope results in a 90° feed angle (i.e., the angle between the path of an incoming laser beam and the optical axis of the scan lens system 56).

A scan lens system, generally designated by reference number 56, is provided at the exit side of the laser beam deflector assembly 44. The scan lens system 56, as illustrated in FIG. 2, includes a convex lens 58 and a cylindrical lens 60. The cylindrical lens 60 has a face 62. As shown in FIG. 2, the longitudinal axis of the laser beam deflector assembly 44 is substantially aligned with the optical axis of the scan lens system 56.

As further illustrated in FIG. 2, the conical-shaped laser beam output 54 is truncated by the convex lens 58 so as to transmit therefrom a cylindrical laser beam output 64 which forms and inscribes circle 66 (see, FIG. 3) when the cylindrical laser beam output 64 is truncated by the cylindrical lens 60.

The convex lens 58, and the cylindrical lens 60 of the scan lens system 56 are placed in an appropriate sequence, as shown in FIG. 2, in order to: (1) collapse the inscribed circle 66 to a laser scan line 68, and (2) focus the laser beam to an appropriate spot, at the scan track.

Figure 3:
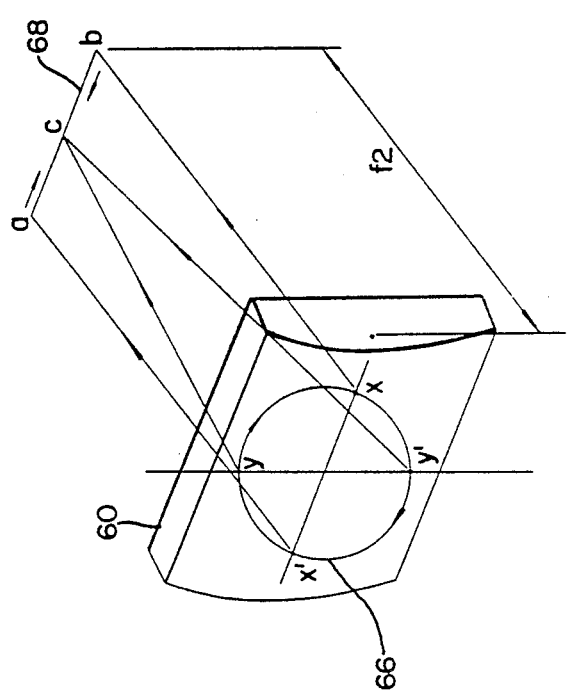
FIG. 3 is a perspective view of one of the lenses employed in the scan lens system illustrated in FIG. 2.

FIG. 3 illustrates in more detail the manner in which the cylindrical lens 60 collapses the inscribed circle 66 to a scan line 68.

As illustrated in FIGS. 2 and 3, the focal lengths of the convex lens 58 and the cylindrical lens 60 are designated by $f_1$ and $f_2$, respectively.

Figure 4:
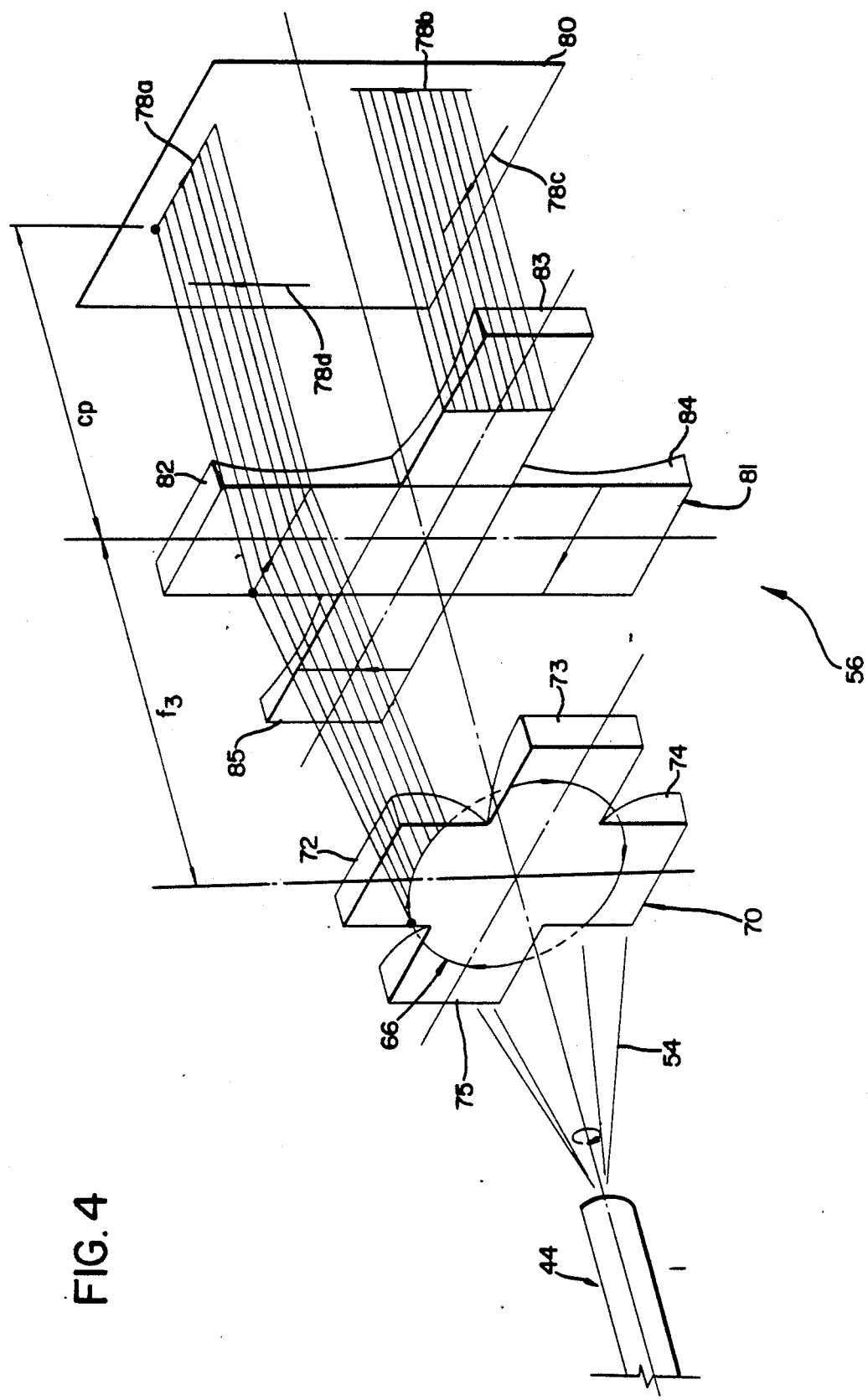
FIG. 4 is another example of the laser scan device of the present invention showing various shapes for the different lenses which can be employed in the scan lens system.

FIG. 4 shows another example of the laser scanning device of the present invention. Here, the conical-shaped laser beam output 54 emanating from the laser beam deflector assembly 44 is directed to a four-leaf plano-cylindrical optical element 70. The optical element 70 includes four-leaf portions 72, 73, 74, 75, as shown in FIG. 4. As further shown in FIG. 4, the inscribed circle 66 is collapsed to a scan track having sides 78a, 78b, 78c, 78d on a scan plane 80 with the use of four-leaf optical elements 70, 81. The four-leaf plano-concave optical element 81 also includes four-leaf portions 82, 83, 84, 85. As shown in FIG. 4, the longitudinal axis of the laser beam deflector assembly 44 is substantially aligned with the optical axis of the scan lens system 56. The focal length of the four-leaf plano-cylindrical optical element 70 shown in FIG. 4 is designated with $f_3$, while the collimated plane is designated "CP" in FIG. 4.

Figure 5:
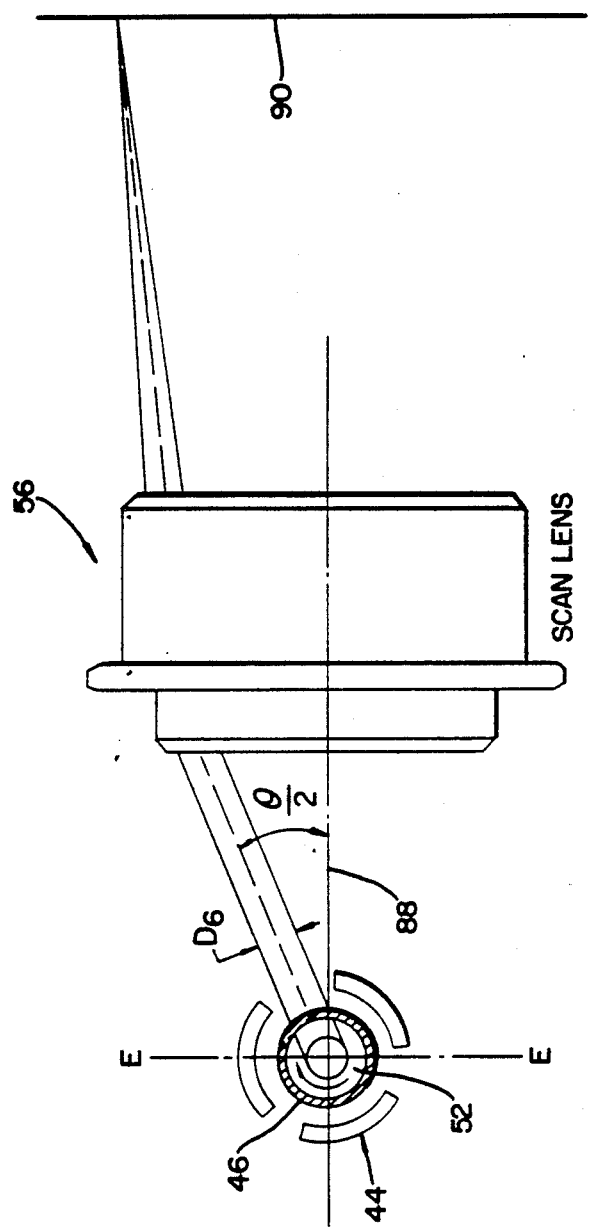
FIG. 5 is a schematic view of yet another example of the laser scanning device of this invention having a feed angle of 90°.

Another example of the laser scan device of this invention is illustrated in FIG. 5. The laser beam deflector assembly 44 is positioned perpendicular to the plane of the page so that the longitudinal axis of the rotating hollow shaft 46 is normal to the optical axis 88 of the scan lens system 56. In other words, the feed angle (i.e., the angle between the incoming laser beam and the optical axis 88 of the scan lens system 56) is equal to 90°. The scan lens system 56 in FIG. 5 can be any permutation of lenses in any configuration, including the lens combinations previously described. The combination of lenses, constituting a scan lens system, is such that the scanning of a multidirectional scan track is facilitated. The scan lens system 56 of this invention can be designed for specific applications or can be designed and manufactured by the company named Melles Griot of Rochester, N.Y. The optical element used in the invention illustrated in FIG. 5 is preferably a 45° prism.

It is to be noted that in some applications, the peripheral positioning of several scan lens systems surrounding the vertically placed laser beam deflector may be advantageous in scanning multiple scan tracks.

Laser beam diameter $D_b$, (see, e.g., FIG. 5) entering the scan lens is measured at an intensity of $1/e^2$. It is an important parameter because of its effect on the spot size, and depth of focus at the image plane. The laser spot size is determined by the relationship:

$$S = \frac{1.27\lambda F}{D_b}$$

wherein,
S = Spot diameter;
$\lambda$ = Design wavelength;
F = Focal length; and
$D_b$ = Beam diameter.

The operation of the various examples described above for the laser scanning device of this invention is hereinafter described.

As shown in FIG. 2, the rotation of the laser beam emanating from the optical element 52 results in a conical laser beam 54 in free space. The convex lens 58 truncates the conical laser beam 54, and transmits therefrom a cylindrical beam 64 which forms an inscribed circle 66 as better illustrated in FIG. 3. When the laser beam traverses along the inscribed circle 66 from point x' through point y, as shown in FIG. 3, this results in a laser scan, at the scan track, from point a to point c, by the laser spot 68. Similarly, when the laser beam traverses along the inscribed circle 66 from point y through point x, the laser spot 68 travels from point c to point b. When the laser beam traverses along the inscribed circle 66 from point x to point y', the laser spot 68 travels from point b to point c along the scan track. In other words, when the laser beam traverses the upper half of the inscribed circle 66, this provides for a laser scan along the scan track from point a to point b, whereas when the laser beam traverses along the lower half of the inscribed circle 66, this results in the return trip of the laser spot 68 along the scan track from point b to point a. A uni-directional scan can also be obtained by simply blocking off the transmission of either the upper half or the lower half of the inscribed circle 66 depending on the desired travel direction of the laser spot 68 along the scan track. See, for example, the scan track shape of Example No. 2 shown in Table 1.

It is to be noted that a scan lens system may include a permutation of lenses assembled in an appropriate array in order to produce the desired result at the scan track, as shown in the various scan track shapes in Example Nos. 2-7 in Table 1. For example, a lens system having three-leaf optical elements may provide a triangular scan along a triangular scan track.

The scan lens system shown in FIG. 4, having the four-leaf plano-cylindrical optical element 70, and the four-leaf plano-concave optical element 81, effectively produces a scan track shape with a set of parallel vertical scan lines 78b, 78d, and a set of parallel horizontal scan lines 78a, 78c. In FIG. 4, when the laser beam traverses along the inscribed circle 66 from one end to an opposing end of the first leaf 72, in the clockwise direction, a scan line from left to right of the upper horizontal track 78a (of the rectangular scan track 80) is swept. Similarly, when the laser beam traverses along the inscribed circle 66 from one end to an opposing end along the leaf 73, this results in a vertical scan line 78b (along the rectangular scan track 80). The scanning along the lines 78c, 78b (of the rectangular scan track 80) in the direction, as shown in FIG. 4, results from the clockwise laser beam travel of the inscribed circle 66 on the leaf 74 and leaf 75, respectively.

While the invention has been particularly shown and described in reference to preferred embodiments thereof it will be understood by those skilled in the art that changes in form and details may be made therein without departing from the scope and spirit of the invention.

TABLE 1

| EXAMPLE NO. | Scan Track Shape | Single Rotating Mirror | Invention |
|---|---|---|---|
| 1 | ←——— | X | X |
| 2 | ——→ ←—— | | X |
| 3 | ——→ ←—— | | X |
| 4 | (rectangle outline) | | X |
| 5 | (triangle) | | X |
| 6 | (square) | | X |
| 7 | (hexagon) | | X |

What is claimed is:

1. A laser scanning device, comprising:
   a laser source means for emitting a laser beam;
   a laser beam deflector means for receiving said laser beam and deflecting said laser beam, wherein said laser beam deflector means includes a rotating hollow shaft and an optical element mounted within said rotating hollow shaft; and
   a scan lens means for receiving said deflected laser beam, said laser beam deflector means deflects said laser beam onto said scan lens means in the form of an inscribed circle, said scan lens means collapses said inscribed circle to a laser spot for scanning along a scan track.

2. The laser scanning device as in claim 1, wherein said scan lens means collapses said inscribed circle to said laser spot for a uni-directional scanning along said scan track.

3. The laser scanning device as in claim 1, wherein said scan lens means collapses said inscribed circle to said laser spot for a multi-directional scanning along said scan track.

4. The laser scanning device as in claim 1, further comprising a motor means for rotating said hollow shaft.

5. A laser scanning device, comprising:
a laser source means for emitting a laser beam;
a laser beam deflector means for receiving said laser beam and deflecting said laser beam, wherein said laser beam deflector means includes a rotating hollow shaft and an optical element mounted within said rotating hollow shaft, and a motor means for rotating said hollow shaft; and
a scan lens means for receiving said deflected laser beam, said laser beam deflector means deflects said laser beam onto said scan lens means in the form of an inscribed circle, said scan lens means collapses said inscribed circle to a laser spot for scanning along a scan track.

6. The laser scanning device as in claim 5, wherein said scan lens means focuses said deflected laser beam to said laser spot for a uni-directional scanning along said scan track.

7. The laser scanning device as in claim 5, wherein said scan lens means focuses said deflected laser beam to said laser spot for a multi-directional scanning along said scan track.

8. The laser scanning device as in claim 5, wherein said scan lens means has an optical axis, said optical axis of said scan lens means being coincident with a longitudinal axis of the said laser beam deflector means.

9. The laser scanning device as in claim 5, wherein said scan lens means has an optical axis, wherein an angle between a path through which said laser beam emanates from said laser beam deflector means and said optical axis is 90 degrees.

10. A method for laser scanning, comprising the steps of:
emitting a laser beam;
collimating said laser beam;
guiding said laser beam into a laser beam deflector;
deflecting said laser beam at an exit portion of said laser beam deflector and onto a scan lens means in the form of an inscribed circle, wherein said step of deflecting said laser beam includes the step of rotating a hollow portion shaft and an optical lens mounted within said rotating hollow shaft; and
collapsing said inscribed circle to a laser spot for scanning along a scan track.

11. The method for laser scanning as in claim 10, further comprising the step of focusing said deflected laser beam to said laser spot for scanning along said scan track.

12. The method for laser scanning as in claim 11, wherein said step of focusing said deflected laser beam includes the step of focusing said deflected laser beam to said laser spot for a uni-directional scanning along said scan track.

13. The method for laser scanning as in claim 11, wherein said step of focusing deflected laser beam includes the step of focusing said deflected laser beam to said laser spot for a multi-directional scanning along said scan track.

14. The laser scanning device as in claim 10, wherein said step of rotating said hollow shaft includes the step of rotating said hollow shaft with a motor.

15. A method for laser scanning, comprising the steps of:
emitting a laser beam;
collimating said laser beam;
guiding said laser beam into a laser beam deflector;
deflecting said laser beam through said laser beam deflector and onto a scan lens means in the form of an inscribed circle, wherein said step of deflecting said laser beam includes the step of rotating a hollow shaft and an optical lens mounted within said rotating hollow shaft; and
focusing said deflected laser beam by collapsing said inscribed circle to a laser spot for scanning along a scan track.

16. The method for laser scanning as in claim 15, wherein said step of focusing said deflected laser beam includes the step of focusing said deflected laser beam to said laser spot for a uni-directional scanning along said scan track.

17. The method for laser scanning as in claim 15, wherein said step of focusing said deflected laser beam includes the step of focusing said deflected laser beam to said laser spot for a multi-directional scanning along said scan track.

18. The method for laser scanning as in claim 15, wherein the angle between a longitudinal axis of said beam deflector and an optical axis is zero degree.

19. The method for laser scanning as in claim 15, wherein the angle between a longitudinal axis of said deflector and an optical axis is 90 degrees.

* * * * *